US012774006B2

(12) United States Patent
Vijaya Kumar et al.

(10) Patent No.: US 12,774,006 B2
(45) Date of Patent: Oct. 27, 2026

(54) DETERMINING OPTIMAL DEPARTURE TIME FOR A VEHICLE

(71) Applicant: GM Global Technology Operations LLC, Detroit, MI (US)

(72) Inventors: Vivek Vijaya Kumar, Shelby Township, MI (US); Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 18/805,925

(22) Filed: Aug. 15, 2024

(65) Prior Publication Data

US 2026/0048757 A1 Feb. 19, 2026

(51) Int. Cl.

*B60W 50/14* (2020.01)
*B60W 60/00* (2020.01)
*H04W 4/46* (2018.01)

(52) U.S. Cl.

CPC .......... *B60W 50/14* (2013.01); *B60W 60/001* (2020.02); *H04W 4/46* (2018.02); (Continued)

(58) Field of Classification Search

CPC ............... B60W 50/14; B60W 60/001; B60W 2050/146; B60W 2554/406; B60W 2556/10; B60W 2556/65; B60W 40/04; B60W 60/00; H04W 4/46; H04W 4/44; G08G 1/0133; G08G 1/0145; G08G 1/096716; G08G 1/096741; G08G 1/0112; G08G 1/0141; G08G 1/052; G08G 1/065; G08G 1/096725; G08G 1/096775; B60K 35/22

See application file for complete search history.

(56) References Cited

U.S. PATENT DOCUMENTS

2011/0224893 A1* 9/2011 Scofield ................ G08G 1/052 701/119
2012/0022764 A1* 1/2012 Tang .................. B60W 30/188 701/102

(Continued)

FOREIGN PATENT DOCUMENTS

DE 102015015868 A1 6/2016
DE 102022119256 A1 4/2023
DE 102023002887 A1 2/2024

*Primary Examiner* — Ryan W Sherwin
(74) *Attorney, Agent, or Firm* — Vivacqua Crane, PLLC

(57) ABSTRACT

A method for providing traffic information to an occupant of a vehicle may include identifying a node location in an environment surrounding the vehicle. The node location is a location of an intersection between a first road having a first road class upon which the vehicle is traveling and a second road having a second road class. The first road class is lower than the second road class. The method further may include determining traffic data about one or more remote vehicles traveling on a segment of the second road adjacent to the node location. The method further may include determining an estimated wait time for the vehicle based at least in part on the traffic data and a distance between the vehicle and the node location. The method further may include performing a first action based at least in part on the estimated wait time.

15 Claims, 3 Drawing Sheets

(52) U.S. Cl.
CPC . *B60W 2050/146* (2013.01); *B60W 2554/406* (2020.02); *B60W 2556/10* (2020.02); *B60W 2556/65* (2020.02)

(56) References Cited

U.S. PATENT DOCUMENTS

| | | | | |
|---|---|---|---|---|
| 2014/0266798 | A1* | 9/2014 | Witte | G08G 1/0112 340/907 |
| 2015/0015421 | A1* | 1/2015 | Krijger | G08G 1/096716 340/932 |
| 2015/0168157 | A1* | 6/2015 | Hoch | G01C 21/3469 701/400 |
| 2015/0235556 | A1* | 8/2015 | Gordon | G08G 1/096775 701/117 |
| 2017/0076227 | A1* | 3/2017 | Elgie | B60W 40/04 |
| 2020/0064139 | A1* | 2/2020 | Mieth | G08G 1/096844 |
| 2021/0063184 | A1* | 3/2021 | Heinisch | G08G 1/0116 |
| 2021/0201669 | A1 | 7/2021 | Mitra et al. | |

* cited by examiner

DETERMINING OPTIMAL DEPARTURE TIME FOR A VEHICLE

INTRODUCTION

The present disclosure relates to advanced driver assistance and automated driving systems and methods for vehicles, and more particularly, to systems and methods for mitigating traffic congestion and increasing occupant comfort for a vehicle.

To increase occupant awareness and convenience, vehicles may be equipped with advanced driver assistance systems (ADAS) and/or automated driving systems (ADS). ADAS systems may use various sensors such as cameras, radar, and LiDAR to detect and identify objects around the vehicle, including other vehicles, pedestrians, road configurations, and traffic signs. ADAS systems may take actions based on environmental conditions surrounding the vehicle, such as applying brakes or alerting an occupant of the vehicle. However, current ADS systems may not account for additional factors which may affect occupant experience. For example, transiting through an intersection between a lower class road (e.g., a local road) and a higher class road (e.g., a collector road) may result in delays due to higher traffic density on the higher class road. Furthermore, waiting at traffics signals may also result in delays.

Thus, while ADAS and ADS systems and methods achieve their intended purpose, there is a need for a new and improved system and method for providing traffic information to an occupant of a vehicle.

SUMMARY

According to several aspects, a method for providing traffic information to an occupant of a vehicle is provided. The method may include identifying a node location in an environment surrounding the vehicle. The node location is a location of an intersection between a first road upon which the vehicle is traveling and a second road. The first road has a first road class, and the second road has a second road class. The first road class is lower than the second road class. The method further may include determining traffic data about one or more remote vehicles traveling on a segment of the second road. The segment of the second road is adjacent to the node location. The method further may include determining an estimated wait time for the vehicle based at least in part on the traffic data and a distance between the vehicle and the node location. The method further may include performing a first action based at least in part on the estimated wait time.

In another aspect of the present disclosure, determining the traffic data further may include receiving remote vehicle telemetry data from the one or more remote vehicles. The remote vehicle telemetry data includes at least a location of each of the one or more remote vehicles. Determining the traffic data further may include determining the traffic data based at least in part on the remote vehicle telemetry data.

In another aspect of the present disclosure, determining the traffic data further may include determining a percentage of the one or more remote vehicles traveling below a speed limit of the segment of the second road over a recent historical time period. Determining the traffic data further may include determining a percentage of the one or more remote vehicles traveling below a free flow speed of the segment of the second road over the recent historical time period. Determining the traffic data further may include determining a level of service categorization of the segment of the second road over the recent historical time period. Determining the traffic data further may include determining a road segment traffic profile based at least in part on at least one of: the percentage of the one or more remote vehicles traveling below a speed limit of the segment of the second road, the percentage of the one or more remote vehicles traveling below a free flow speed of the segment of the second road, and the level of service categorization of the segment of the second road. The road segment traffic profile describes a perceived traffic level on the segment of the second road over the recent historical time period.

In another aspect of the present disclosure, determining the traffic data further may include receiving signal phase and timing (SPaT) data from a traffic signal at the node location over the recent historical time period. Determining the traffic data further may include determining the road segment traffic profile based at least in part on at least one of: the percentage of the one or more remote vehicles traveling below a speed limit of the segment of the second road, the percentage of the one or more remote vehicles traveling below a free flow speed of the segment of the second road, the level of service categorization of the segment of the second road, and the SPAT data. The road segment traffic profile describes a perceived traffic level on the segment of the second road over the recent historical time period.

In another aspect of the present disclosure, determining the estimated wait time further may include identifying repeating time periods when the road segment traffic profile reaches a minimum value. Determining the estimated wait time further may include determining the estimated wait time based at least in part on the repeating time periods when the road segment traffic profile approaches the minimum value.

In another aspect of the present disclosure, identifying the repeating time periods when the road segment traffic profile reaches a minimum value further may include fitting the road segment traffic profile to a periodic curve. Identifying the repeating time periods when the road segment traffic profile reaches a minimum value further may include determining one or more parameters characterizing the periodic curve. The one or more parameters includes at least a minimum traffic value and a period. Identifying the repeating time periods when the road segment traffic profile reaches a minimum value further may include identifying the repeating time periods based at least in part on the minimum traffic value and the period.

In another aspect of the present disclosure, determining the estimated wait time based at least in part on the repeating time periods further may include determining an estimated delay time until the perceived traffic level on the segment of the second road is estimated to reach the minimum traffic value based at least in part on the one or more parameters characterizing the periodic curve and a current perceived traffic level of the segment of the second road. Determining the estimated wait time based at least in part on the repeating time periods further may include determining an estimated travel time for the vehicle to reach the node location based at least in part on the distance between the vehicle and the node location and a free flow speed of the first road. Determining the estimated wait time based at least in part on the repeating time periods further may include determining the estimated wait time based at least in part on the estimated delay time and the estimated travel time. The estimated wait time is a difference between the estimated delay time and the estimated travel time.

In another aspect of the present disclosure, performing the first action further may include providing a notification to the occupant of the vehicle based at least in part on the estimated wait time using a vehicle display.

In another aspect of the present disclosure, providing the notification further may include determining an optimal departure delay based at least in part on the estimated wait time. The optimal departure delay is an amount of time by which the occupant should delay departing such that the estimated wait time is zero upon reaching the node location. Providing the notification further may include providing the notification to the occupant of the vehicle based at least in part on the optimal departure delay.

In another aspect of the present disclosure, performing the first action further may include determining an optimal departure delay based at least in part on the estimated wait time. The optimal departure delay is an amount of time by which the vehicle should delay departing such that the estimated wait time is zero upon reaching the node location. Performing the first action further may include comparing the optimal departure delay to zero. Performing the first action further may include initiating an automated driving route using an automated driving system of the vehicle in response to determining that the optimal departure delay is within a predetermined range of zero.

According to several aspects, a system for providing traffic information to an occupant of a vehicle is provided. The system may include a server system may include a server communication system and a server controller in electrical communication with the server communication system. The server controller is programmed to identify a node location in an environment surrounding the vehicle. The node location is a location of an intersection between a first road upon which the vehicle is traveling and a second road. The first road has a first road class, and the second road has a second road class. The first road class is lower than the second road class. The server controller is further programmed to determine traffic data about one or more remote vehicles traveling on a segment of the second road using the server communication system. The segment of the second road is adjacent to the node location. The server controller is further programmed to determine an estimated wait time for the vehicle based at least in part on the traffic data and a distance between the vehicle and the node location. The server controller is further programmed to transmit the estimated wait time using the server communication system.

In another aspect of the present disclosure, to determine the traffic data, the server controller is further programmed to receive remote vehicle telemetry data from the one or more remote vehicles using the server communication system. The remote vehicle telemetry data includes at least a location of each of the one or more remote vehicles. To determine the traffic data, the server controller is further programmed to determine the traffic data based at least in part on the remote vehicle telemetry data.

In another aspect of the present disclosure, to determine the traffic data, the server controller is further programmed to determine a percentage of the one or more remote vehicles traveling below a speed limit of the segment of the second road over a recent historical time period based at least in part on the remote vehicle telemetry data. To determine the traffic data, the server controller is further programmed to determine a percentage of the one or more remote vehicles traveling below a free flow speed of the segment of the second road over the recent historical time period based at least in part on the remote vehicle telemetry data. To determine the traffic data, the server controller is further programmed to determine a level of service categorization of the segment of the second road over the recent historical time period based at least in part on the remote vehicle telemetry data. To determine the traffic data, the server controller is further programmed to receive signal phase and timing (SPaT) data from a traffic signal at the node location over the recent historical time period. To determine the traffic data, the server controller is further programmed to determine a road segment traffic profile based at least in part on at least one of: the percentage of the one or more remote vehicles traveling below a speed limit of the segment of the second road, the percentage of the one or more remote vehicles traveling below a free flow speed of the segment of the second road, the level of service categorization of the segment of the second road, and the SPAT data. The road segment traffic profile describes a perceived traffic level on the segment of the second road over the recent historical time period.

In another aspect of the present disclosure, to determine the estimated wait time, the server controller is further programmed to fit the road segment traffic profile to a periodic curve. To determine the estimated wait time, the server controller is further programmed to determine one or more parameters characterizing the periodic curve. The one or more parameters includes at least a minimum traffic value and a period. To determine the estimated wait time, the server controller is further programmed to identify repeating time periods when the road segment traffic profile reaches a minimum value based at least in part on the minimum traffic value and the period. To determine the estimated wait time, the server controller is further programmed to determine the estimated wait time based at least in part on the repeating time periods when the road segment traffic profile approaches the minimum value.

In another aspect of the present disclosure, to determine the estimated wait time, the server controller is further programmed to determine an estimated delay time until the perceived traffic level on the segment of the second road is estimated to reach the minimum traffic value based at least in part on the one or more parameters characterizing the periodic curve and a current perceived traffic level of the segment of the second road. To determine the estimated wait time, the server controller is further programmed to determine an estimated travel time for the vehicle to reach the node location based at least in part on the distance between the vehicle and the node location and a free flow speed of the first road. To determine the estimated wait time, the server controller is further programmed to determine the estimated wait time based at least in part on the estimated delay time and the estimated travel time. The estimated wait time is a difference between the estimated delay time and the estimated travel time.

In another aspect of the present disclosure the system further includes a vehicle system. The vehicle system may include a vehicle communication system, a vehicle display, and a vehicle controller in electrical communication with the vehicle communication system and the vehicle display. The vehicle controller is programmed to receive the estimated wait time from the server system using the vehicle communication system. The vehicle controller is further programmed to provide a notification to the occupant of the vehicle based at least in part on the estimated wait time using the vehicle display.

In another aspect of the present disclosure, the vehicle system further includes an automated driving system in electrical communication with the vehicle controller. The vehicle controller is further programmed to determine an optimal departure delay based at least in part on the estimated wait time. The optimal departure delay is an amount of time by which the vehicle should delay departing such that the estimated wait time is zero upon reaching the node location. The vehicle controller is further programmed to compare the optimal departure delay to zero. The vehicle controller is further programmed to initiate an automated driving route using the automated driving system in response to determining that the optimal departure delay is within a predetermined range of zero.

According to several aspects, a method for providing traffic information to an occupant of a vehicle is provided. The method may include identifying a node location in an environment surrounding the vehicle. The node location is a location of an intersection between a first road upon which the vehicle is traveling and a second road. The first road has a first road class, and the second road has a second road class. The first road class is lower than the second road class. The method further may include receiving remote vehicle telemetry data from one or more remote vehicles traveling on a segment of the second road. The remote vehicle telemetry data includes at least a location of each of the one or more remote vehicles. The segment of the second road is adjacent to the node location. The method further may include receiving signal phase and timing (SPaT) data from a traffic signal at the node location. The method further may include determining a road segment traffic profile based at least in part on the remote vehicle telemetry data and the SPAT data. The road segment traffic profile describes a perceived traffic level on the segment of the second road over a recent historical time period. The method further may include determining an estimated wait time for the vehicle based at least in part on the remote vehicle telemetry data, the SPAT data, and a distance between the vehicle and the node location. The method further may include providing a notification to the occupant of the vehicle based at least in part on the estimated wait time using a vehicle display.

In another aspect of the present disclosure, determining the estimated wait time further may include fitting the road segment traffic profile to a periodic curve. Determining the estimated wait time further may include determining one or more parameters characterizing the periodic curve. The one or more parameters includes at least a minimum traffic value and a period. Determining the estimated wait time further may include identifying repeating time periods when the road segment traffic profile reaches a minimum value based at least in part on the minimum traffic value and the period. Determining the estimated wait time further may include determining an estimated delay time until the perceived traffic level on the segment of the second road is estimated to reach the minimum traffic value based at least in part on the one or more parameters characterizing the periodic curve and a current perceived traffic level of the segment of the second road. Determining the estimated wait time further may include determining an estimated travel time for the vehicle to reach the node location based at least in part on the distance between the vehicle and the node location and a free flow speed of the first road. Determining the estimated wait time further may include determining the estimated wait time based at least in part on the estimated delay time and the estimated travel time. The estimated wait time is a difference between the estimated delay time and the estimated travel time.

In another aspect of the present disclosure, the method further may include determining an optimal departure delay based at least in part on the estimated wait time. The optimal departure delay is an amount of time by which the vehicle should delay departing such that the estimated wait time is zero upon reaching the node location. The method further may include comparing the optimal departure delay to zero. The method further may include initiating an automated driving route using an automated driving system of the vehicle in response to determining that the optimal departure delay is within a predetermined range of zero.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Transiting through an intersection between a lower class road (e.g., a local road) and a higher class road (e.g., a collector road) may result in delays due to higher traffic density on the higher class road. Furthermore, waiting at traffics signals may also result in delays. Accordingly, the present disclosure provides a new and improved system and method for providing traffic information to an occupant of a vehicle which accounts for traffic density and traffic signal behavior to determine an optimal departure time for the vehicle to minimize delays and traffic congestion.

Figure 1:
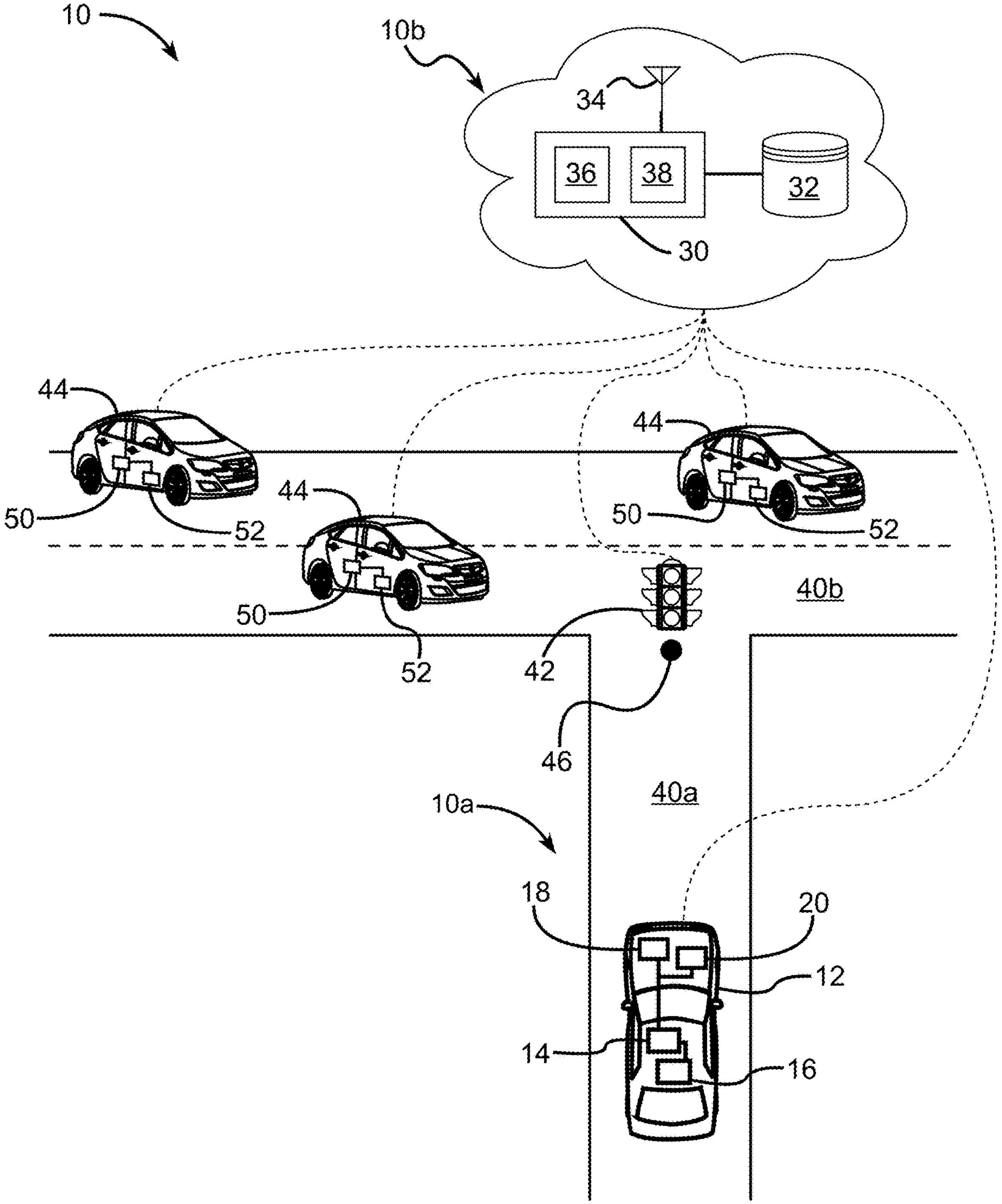
FIG. 1 is a schematic diagram of a system for providing traffic information to an occupant of a vehicle, according to an exemplary embodiment.

Referring to FIG. 1, a system for providing traffic information to an occupant of a vehicle is illustrated and generally indicated by reference number 10. The system 10 generally includes a vehicle system **10*a* and a server system 10*b***.

The vehicle system **10*a* is shown with an exemplary vehicle 12. While a passenger vehicle is illustrated, it should be appreciated that the vehicle 12 may be any type of vehicle without departing from the scope of the present disclosure. The vehicle system 10*a* generally includes a vehicle controller 14, a plurality of vehicle sensors 16, a vehicle display 18, and an automated driving system 20**.

The vehicle controller 14 is used to implement a method 100 for providing traffic information to an occupant of a vehicle, as will be described below. The vehicle controller 14 includes at least one processor and a non-transitory computer readable storage device or media. The processor may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12.

The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the plurality of vehicle sensors 16, the vehicle display 18, and the automated driving system 20. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure. It should further be understood that, in the scope of the present disclosure, electrical communication also includes power and/or energy transfer between electrical devices (e.g., using conducting wires and/or wireless power transmission techniques).

The plurality of vehicle sensors 16 are used to acquire information relevant to the vehicle 12. In an exemplary embodiment, the plurality of vehicle sensors 16 includes at least a telemetry sensor (not shown) and a vehicle communication system (not shown).

The telemetry sensor is used to gather telemetry data about the vehicle 12. In an exemplary embodiment, the telemetry data includes at least a location of the vehicle 12. In another exemplary embodiment, the telemetry data further includes a speed of the vehicle 12. In another exemplary embodiment, the telemetry data further includes a heading of the vehicle 12. In another exemplary embodiment, the telemetry data further includes an acceleration of the vehicle 12. The telemetry sensor is in electrical communication with the vehicle controller 14, as discussed above.

In a non-limiting example, to determine the location of the vehicle 12, the telemetry sensor includes a global navigation satellite system (GNSS). The GNSS is used to determine a geographical location of the vehicle 12. In an exemplary embodiment, the GNSS is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. It should be understood that various additional types of satellite-based radionavigation systems, such as, for example, the Global Positioning System (GPS), Galileo, GLONASS, and the BeiDou Navigation Satellite System (BDS) are within the scope of the present disclosure.

In a non-limiting example, to determine the speed, heading, and acceleration of the vehicle 12, the telemetry sensor further includes an inertial measurement unit (IMU). The IMU is used to determine an orientation, velocity, and gravitational forces acting upon the vehicle 12. In an exemplary embodiment, the IMU includes several sensors, including accelerometers, gyroscopes, and/or magnetometers. In a non-limiting example, the IMU includes three-axis accelerometers and three-axis gyroscopes, which are integrated into a single unit. The accelerometers measure linear acceleration along each axis, while the gyroscopes measure angular velocity about each axis. The IMU processes data from the sensors to calculate the current orientation, speed, heading, yaw rate (i.e., rate of change of heading), and acceleration of the vehicle 12 in three-dimensional space.

The vehicle communication system is used by the vehicle controller 14 to communicate with other systems external to the vehicle 12 (e.g., the server system **10*b*, as will be discussed below). For example, the vehicle communication system includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12** and any remote system (e.g., vehicles, infrastructure, and/or remote systems).

In certain embodiments, the vehicle communication system is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system may further include an embedded universal integrated circuit card (eUICC) configured to store at least one cellular connectivity configuration profile, for example, an embedded subscriber identity module (eSIM) profile.

The vehicle communication system is further configured to communicate via a personal area network (e.g., BLUETOOTH), near-field communication (NFC), and/or any additional type of radiofrequency communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure.

Accordingly, the vehicle communication system may include one or more antennas and/or communication transceivers for receiving and/or transmitting signals, such as cooperative sensing messages (CSMs). The vehicle communication system is configured to wirelessly communicate information between the vehicle 12 and another vehicle.

Further, the vehicle communication system is configured to wirelessly communicate information between the vehicle 12 and infrastructure or other vehicles. It should be understood that the vehicle communication system may be integrated with the vehicle controller 14 (e.g., on a same circuit board with the vehicle controller 14 or otherwise a part of the vehicle controller 14) without departing from the scope of the present disclosure.

In another exemplary embodiment, the plurality of vehicle sensors 16 further includes sensors to determine performance data about the vehicle 12. In a non-limiting example, the plurality of vehicle sensors 16 further includes at least one of a motor speed sensor, a motor torque sensor, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the plurality of vehicle sensors 16 further includes sensors to determine information about an environment within the vehicle 12. In a non-limiting example, the plurality of vehicle sensors 16 further includes at least one of a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about an environment surrounding the vehicle 12. In a non-limiting example, the plurality of vehicle sensors 16 further includes at least one of an ambient air temperature sensor, a barometric pressure sensor, a global navigation satellite system (GNSS), and/or a photo and/or video camera which is positioned to view the environment in front of and/or surrounding the vehicle 12.

In another exemplary embodiment, at least one of the plurality of vehicle sensors 16 is a perception sensor capable of perceiving objects and/or measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, cameras, and/or time-of-flight sensors are within the scope of the present disclosure. The plurality of vehicle sensors 16 are in electrical communication with the vehicle controller 14 as discussed above.

The vehicle display 18 is used to provide information to an occupant of the vehicle 12. In the scope of the present disclosure, the occupant includes a driver and/or a passenger of the vehicle 12. In an exemplary embodiment, the vehicle display 18 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the vehicle display 18 is disposed in a rearview mirror are also within the scope of the present disclosure.

In another exemplary embodiment, the vehicle display 18 includes a head-up display (HUD) configured to provide information to the occupant by projecting text, graphics, and/or images upon the windscreen of the vehicle 12. The text, graphics, and/or images are reflected by the windscreen of the vehicle 12 and are visible to the occupant without looking away from a roadway ahead of the vehicle 12. In another exemplary embodiment, the vehicle display 18 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. In an exemplary embodiment, the occupant may interact with the vehicle display 18 using a human-interface device (HID), including, for example, a touchscreen, an electromechanical switch, a capacitive switch, a rotary knob, and the like. It should be understood that additional systems for displaying information to the occupant of the vehicle 12 are also within the scope of the present disclosure. The vehicle display 18 is in electrical communication with the vehicle controller 14, as discussed above.

The automated driving system 20 is used to provide assistance to the occupant to increase occupant awareness and/or control behavior of the vehicle 12. In the scope of the present disclosure, the automated driving system 20 encompasses systems which provide any level of assistance to the occupant (e.g., blind spot warning, lane departure warning, and/or the like) and systems which are capable of autonomously driving the vehicle 12 under some or all conditions (e.g., automated lane keeping, adaptive cruise control, fully autonomous driving, and/or the like). It should be understood that all levels of driving automation defined by, for example, Society of Automotive Engineers (SAE) J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 20 is configured to detect and/or receive information about the environment surrounding the vehicle 12 and process the information to provide assistance to the occupant. In some embodiments, the automated driving system 20 is a software module executed on the vehicle controller 14. In other embodiments, the automated driving system 20 includes a separate automated driving system controller, similar to the vehicle controller 14, capable of processing the information about the environment surrounding the vehicle 12. In an exemplary embodiment, the automated driving system 20 may operate in a manual operation mode, a partially automated operation mode, and a fully automated operation mode.

In the scope of the present disclosure, the manual operation mode means that the automated driving system 20 provides warnings or notifications to the occupant but does not intervene or control the vehicle 12 directly. In a non-limiting example, the automated driving system 20 receives information from the plurality of vehicle sensors 16. Using techniques such as, for example, computer vision, the automated driving system 20 understands the environment surrounding the vehicle 12 and provides assistance to the occupant. For example, if the automated driving system 20 identifies, based on data from the plurality of vehicle sensors 16, that the vehicle 12 is likely to collide with a remote vehicle, the automated driving system 20 may use the vehicle display 18 to provide a warning to the occupant.

In the scope of the present disclosure, the partially automated operation mode means that the automated driving system 20 provides warnings or notifications to the occupant and may intervene or control the vehicle 12 directly in certain situations. In a non-limiting example, the automated driving system 20 is additionally in electrical communication with components of the vehicle 12 such as a brake system, a propulsion system, and/or a steering system of the vehicle 12, such that the automated driving system 20 may control the behavior of the vehicle 12. In a non-limiting example, the automated driving system 20 may control the behavior of the vehicle 12 by applying brakes of the vehicle 12 to avoid an imminent collision. In another non-limiting example, the automated driving system 20 may control the steering system of the vehicle 12 to provide an automated lane keeping feature. In another non-limiting example, the automated driving system 20 may control the brake system, propulsion system, and steering system of the vehicle 12 to temporarily drive the vehicle 12 towards a predetermined destination. However, intervention by the occupant may be required at any time. In an exemplary embodiment, the automated driving system 20 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 20 uses data from the plurality of vehicle sensors 16 to understand the environment and control the vehicle 12 to drive the vehicle 12 to a predetermined destination without a need for control or intervention by the occupant.

The automated driving system 20 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the plurality of vehicle sensors 16. In another exemplary embodiment, the path planning algorithm is a deterministic algorithm which has been programmed to output control signals for the vehicle 12 based on data collected from the plurality of vehicle sensors 16.

In a non-limiting example, the path planning algorithm generates a sequence of waypoints or a continuous path that the vehicle 12 should follow to reach a destination while adhering to rules, regulations, and safety constraints. The sequence of waypoints or continuous path is generated based at least in part on a detailed map and a current state of the vehicle 12 (i.e., position, velocity, and orientation of the vehicle 12). The detailed map includes, for example, information about lane boundaries, road geometry, speed limits, traffic signs, and/or other relevant features. In an exemplary embodiment, the detailed map is stored in the media of the vehicle controller 14 and/or on a remote database or server. In another exemplary embodiment, the path planning algorithm performs perception and mapping tasks to interpret data collected from the plurality of vehicle sensors 16 and create, update, and/or augment the detailed map.

It should be understood that the automated driving system 20 may include any software and/or hardware module configured to operate in the manual operation mode, the partially automated operation mode, or the fully automated operation mode as described above. The automated driving system 20 is in electrical communication with the vehicle controller 14, as discussed above.

With continued reference to FIG. 1, the server system **10*b* generally includes a server controller 30 in electrical communication with a server database 32 and a server communication system 34. In a non-limiting example, the server system 10*b*** is located in a server farm, datacenter, or the like, and connected to the internet.

The server controller 30 is used to implement the method 100 for providing traffic information to an occupant of a vehicle, as will be described below. The server controller 30 includes at least one server processor 36 and a server non-transitory computer readable storage device or server media 38. The description of the type and configuration given above for the vehicle controller 14 also applies to the server controller 30. In some examples, the server controller 30 may differ from the vehicle controller 14 in that the server controller 30 is capable of a higher processing speed, includes more memory, includes more inputs/outputs, and/or the like. In a non-limiting example, the server processor 36 and server media 38 of the server controller 30 are similar in structure and/or function to the processor and the media of the vehicle controller 14, as described above.

The server database 32 is used to store detailed maps of roadways, including, for example, information about lane boundaries, road geometry, speed limits, traffic signs, and/or other relevant features. The server database 32 is further used to store telemetry data received from vehicles, as will be discussed in greater detail below. In an exemplary embodiment, the server database 32 includes one or more mass storage devices, such as, for example, hard disk drives, magnetic tape drives, magneto-optical disk drives, optical disks, solid-state drives, and/or additional devices operable to store data in a persisting and machine-readable fashion. In some examples, the one or more mass storage devices may be configured to provide redundancy in case of hardware failure and/or data corruption, using, for example, a redundant array of independent disks (RAID). In a non-limiting example, the server controller 30 may execute software such as, for example, a database management system (DBMS), allowing data stored on the one or more mass storage devices to be organized and accessed.

The server communication system 34 is used to communicate with external systems, such as, for example, the vehicle controller 14 via the vehicle communication system. In a non-limiting example, the server communication system 34 is similar in structure and/or function to the vehicle communication system, as described above. In some examples, the server communication system 34 may differ from the vehicle communication system in that the server communication system 34 is capable of higher power signal transmission, more sensitive signal reception, higher bandwidth transmission, additional transmission/reception protocols, and/or the like.

With continued reference to FIG. 1, the system 10 is shown in an environment including a first road **40*a*, a second road 40*b*, a traffic signal 42, and one or more remote vehicles 44**.

The first road **40*a* is a road upon which the vehicle 12 is traveling. In an exemplary embodiment, the first road 40*a* has a first road class. The second road 40*b* is a road upon which the one or more remote vehicles 44 are traveling. In an exemplary embodiment, the second road 40*b*** has a second road class. In the scope of the present disclosure, "road class" indicates a classification of a particular road based on the function and traffic capacity of the particular road. In a non-limiting example, roads may be classified as local, collector, arterial, or freeway, with local being the "lowest" road class (by traffic capacity) and freeway being the "highest" road class (by traffic capacity). In an exemplary embodiment, the first road class is lower than the second road class. In a non-limiting example, the first road class is local and the second road class is collector.

As shown in FIG. 1, in an exemplary embodiment, the first road 40*a* intersects with the second road 40*b* at a node location 46. In the scope of the present disclosure, the node location 46 defines a location of an intersection between a road upon which the vehicle 12 is traveling (e.g., the first road 40*a*) and a road of a higher class (e.g., the second road 40*b*). In an exemplary embodiment, the traffic signal 42 is used to control the intersection between the first road 40*a* and the second road 40*b*. In a non-limiting example, the traffic signal 42 includes one or more lamps which may be illuminated according to signal phase and timing (SPaT) data. In the scope of the present disclosure, SPaT data contains information about the traffic signal 42 such as, for example, the current signal phase, the remaining time to next phase (i.e., a time remaining until the next signal phase change), a future signal phase timing (i.e., timing and duration of upcoming signal phases), pedestrian crossing signal phases, and/or the like.

The SPaT data is managed and communicated by traffic control infrastructure. For example, the traffic control infrastructure managing the SPaT data may include a traffic management center (i.e., a centralized facility which monitors and manages traffic flow), a roadside unit (i.e., a device installed near the node location 46 configured to manage SPaT data), a traffic signal controller (i.e., a device installed near the node location 46 which is primarily configured to control timing and sequencing of the traffic signal 42), and/or the traffic signal 42 itself. In an exemplary embodiment, the SPAT data is regularly transmitted to the server system 10*b* by the traffic control infrastructure, as will be discussed in greater detail below.

The one or more remote vehicles 44 are traveling on a segment of the second road 40*b*. In the scope of the present disclosure the segment of the second road 40*b* is a portion of the second road 40*b* within a predetermined distance of the node location 46 (e.g., one mile) and adjacent to the node location 46 (i.e., including or directly bordering the node location 46). In an exemplary embodiment, the one or more remote vehicles 44 each include a remote vehicle controller 50 and a plurality of remote vehicle sensors 52 in electrical communication with the remote vehicle controller 50. In an exemplary embodiment, the remote vehicle controller 50 is similar in structure and function to the vehicle controller 14 discussed above. The plurality of remote vehicle sensors 52 are similar in structure and function to the plurality of vehicle sensors 16 discussed above, including at least a remote vehicle telemetry sensor and a remote vehicle communication system. In an exemplary embodiment, the remote vehicle controller 50 is programmed to repeatedly determine remote vehicle telemetry data (i.e., location, speed, heading, and/or acceleration) of each of the one or more remote vehicles 44 using the plurality of remote vehicle sensors 52 and transmit the telemetry data to the server system 10*b* using the remote vehicle communication system. It should be understood that while passenger vehicles are depicted, the one or more remote vehicles 44 may include any type of vehicles traveling on the second road 40*b*.

Figure 2:
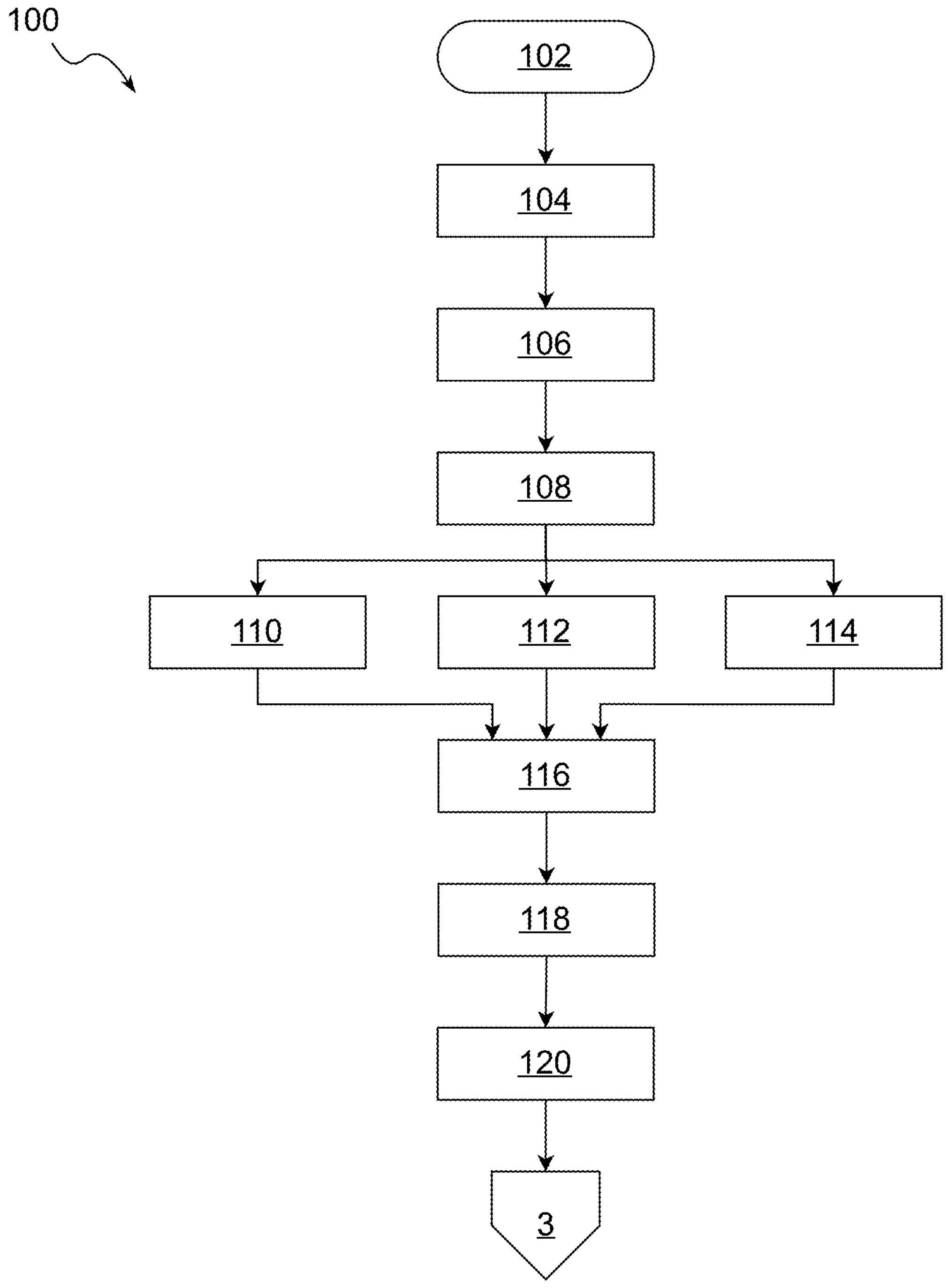
FIG. 2 is a flowchart of a method for providing traffic information to the occupant of the vehicle, according to an exemplary embodiment.

Referring to FIG. 2, a flowchart of the method 100 for providing traffic information to an occupant of a vehicle is shown. The method 100 begins at block 102 and proceeds to block 104. At block 104, the vehicle controller 14 determines a location of the vehicle 12 using the plurality of vehicle sensors 16 and transmits the location of the vehicle 12 to the server system 10*b* using the vehicle communication system. After block 104, the method 100 proceeds to block 106.

At block 106, the server controller 30 receives the location of the vehicle 12 transmitted at block 104 using the server communication system 34 and identifies the node location 46. In an exemplary embodiment, to identify the node location 46, the server controller 30 searches the detailed map to identify an intersection between the road upon which the vehicle 12 is traveling (as determined based on the location of the vehicle 12, i.e., the first road 40*a*) and another road having a higher road class (i.e., the second road 40*b*). In an exemplary embodiment, the node location 46 is further identified based at least in part on a navigation destination of the vehicle 12. In a non-limiting example, the node location 46 is determined to be at an intersection along a navigation path of the vehicle 12. After block 106, the method 100 proceeds to block 108.

At block 108, the server controller 30 receives the remote vehicle telemetry data from the one or more remote vehicles 44 traveling on the segment of the second road 40*b*. In an exemplary embodiment, the server controller 30 uses the server communication system 34 to receive the remote vehicle telemetry data. In a non-limiting example, the remote vehicle telemetry data includes at least a location of each of the one or more remote vehicles 44 within the segment of the second road 40*b*. In another non-limiting example, the remote vehicle telemetry data includes at least a location of each of a subset of the one or more remote vehicles 44 which are within a predetermined range (e.g., one mile) of the node location 46. In an exemplary embodiment, the remote vehicle telemetry data from each of the one or more remote vehicles 44 is saved in the server database 32 and aggregated over at least a recent historical time period (e.g., the previous ten minutes).

At block 108, the server controller 30 also receives the SPaT data from the traffic signal 42. In an exemplary embodiment, the server system 10*b* uses the server communication system 34 to receive the SPAT data. In a non-limiting example, the SPAT data includes at least data about the operation of the traffic signal 42 over the recent historical time period. In an exemplary embodiment, the server controller 30 also receives SPAT data from other traffic signals within a predetermined radius (e.g., two miles) of the node location 46. After block 108, the method 100 proceeds to blocks 110, 112, and 114.

At blocks 110, 112, and 114, the server controller 30 determines traffic data about the one or more remote vehicles 44. In the scope of the present disclosure, traffic data is data pertaining to a movement of the one or more remote vehicles 44 and/or a congestion of the segment of the second road 40*b*. At block 110, the server controller 30 analyzes the remote vehicle telemetry data and/or the SPAT data received at block 108 to determine a percentage of the one or more remote vehicles 44 within the segment of the second road 40*b* traveling below a speed limit of the segment of the second road 40*b* (e.g., fifty miles per hour) over the recent historical time period. In the scope of the present disclosure, the speed limit is a legally mandated maximum allowed speed for the segment of the second road 40*b*.

In an exemplary embodiment, the speed limit of the road segment is retrieved from the detailed map stored in the server database 32. In a non-limiting example, the server controller 30 compares an average speed of each of the one or more remote vehicles 44 over the recent historical time period to the speed limit of the segment of the second road 40*b* to determine the percentage of the one or more remote vehicles 44 within the segment of the second road 40*b* traveling below the speed limit of the segment of the second road 40*b* (e.g., fifty miles per hour) over the recent historical time period. After block 110, the method 100 proceeds to block 116, as will be discussed in greater detail below.

At block 112, the server controller 30 analyzes the remote vehicle telemetry data and/or the SPaT data received at block 108 to determine a percentage of the one or more remote vehicles 44 within the segment of the second road 40*b* traveling below a free flow speed of the segment of the second road 40*b* (e.g., fifty miles per hour) over the recent historical time period. In the scope of the present disclosure, free flow speed is an average vehicle speed measured during low traffic-volume periods under favorable conditions including good weather and no road work or traffic incidents. In an exemplary embodiment, the free flow speed of the road segment is determined based on long-term historical telemetry data (e.g., over a timescale of weeks or months) stored in the server database 32. In a non-limiting example, the server controller 30 compares an average speed of each of the one or more remote vehicles 44 over the recent historical time period to the free flow speed of the segment of the second road 40*b* to determine the percentage of the one or more remote vehicles 44 within the segment of the second road 40*b* traveling below the free flow speed of the segment of the second road 40*b* (e.g., sixty miles per hour) over the recent historical time period. After block 112, the method 100 proceeds to block 116, as will be discussed in greater detail below.

At block 114, the server controller 30 determines a level of service (LOS) categorization of the segment of the second road 40*b* over the recent historical time period. In the scope of the present disclosure, LOS is a quality measure describing operational conditions within a traffic stream. LOS defines how well vehicle traffic flows along a street or road (e.g., the segment of the second road 40*b*). In a non-limiting example, the LOS of the segment of the second road 40*b* is categorized as one of: LOS A, LOS B, LOS C, LOS D, LOS E, or LOS F. LOS A corresponds to free flowing, uninterrupted vehicle traffic. LOS B corresponds to stable vehicle traffic, but where other vehicles are noticeable. LOS C corresponds to stable vehicle traffic, but where vehicle operations are affected by other vehicles. LOS D corresponds to high density free traffic flow where vehicle operations are affected by other vehicles. LOS E corresponds to high density traffic flow nearing road capacity with extremely poor vehicle operating conditions. LOS F corresponds to interrupted traffic flow (e.g., stop-and-go) exceeding road capacity.

In an exemplary embodiment, to determine the LOS categorization of the segment of the second road 40*b*, the server controller 30 analyzes the remote vehicle telemetry data and/or the SPAT data received at block 108. In a non-limiting example, the server controller 30 compares an average speed of each of the one or more remote vehicles 44 and a traffic density (e.g., number of vehicles per square meter) over the recent historical time period to one or more predetermined thresholds to determine the LOS categorization of the segment of the second road 40*b* over the recent historical time period. After block 114, the method 100 proceeds to block 116.

At block 116, the server controller 30 determines a road segment traffic profile. In the scope of the present disclosure, the road segment traffic profile describes a perceived traffic level on the segment of the second road 40*b* over the recent historical time period. In the scope of the present disclosure, the perceived traffic level corresponds to a level of difficulty in transiting the intersection at the node location 46. In the scope of the present disclosure, transiting the intersection includes, for example, proceeding straight through the intersection or performing a turn at the intersection. In the scope of the present disclosure, "level of difficulty" characterizes an amount of time spent waiting for an opportunity to transit the intersection, where higher waiting time corresponds to higher level of difficulty. In another non-limiting example, "level of difficulty" characterizes a level of stress or cognitive exertion required by the occupant in order transit the intersection, where higher stress or cognitive exertion corresponds to higher level of difficulty.

In an exemplary embodiment, the server controller 30 determines the road segment traffic profile based at least in part on the percentage of the one or more remote vehicles 44 traveling below the speed limit of the segment of the second road 40*b* determined at block 110. In a non-limiting example, a relatively high percentage (e.g., over fifty percent) of the one or more remote vehicles 44 traveling below the speed limit is indicative of a high value of the road segment traffic profile at any given time.

In an exemplary embodiment, the server controller 30 determines the road segment traffic profile based at least in part on the percentage of the one or more remote vehicles 44 traveling below the free flow speed of the segment of the second road 40*b* determined at block 112. In a non-limiting example, a relatively high percentage (e.g., over fifty percent) of the one or more remote vehicles 44 traveling below the free flow speed is indicative of a high value of the road segment traffic profile at any given time.

In an exemplary embodiment, the server controller 30 determines the road segment traffic profile based at least in part on the LOS categorization of the segment of the second road 40*b* determined at block 114. In a non-limiting example, a poor LOS (e.g., LOS D or LOS E) is indicative of a high value of the road segment traffic profile at any given time.

In an exemplary embodiment, the server controller 30 determines the road segment traffic profile based at least in part on the SPaT data received at block 108. In a non-limiting example, SPAT data indicating long red light (i.e., stop) phases in the direction of travel of the one or more remote vehicles 44 is indicative of a high value of the road segment traffic profile at any given time.

In an exemplary embodiment, the server controller 30 determines the road segment profile based least in part on the remote vehicle telemetry data received at block 108. In a non-limiting example, remote vehicle telemetry data indicating a relatively high traffic density (e.g., number of vehicles per square meter) is indicative of a high value of the road segment traffic profile at any given time. As discussed above, the road segment traffic profile describes the perceived traffic level over time. Therefore, the road segment traffic profile describes how the perceived traffic level varies over time. After block 116, the method 100 proceeds to block 118.

At block 118, the server controller 30 fits the road segment traffic profile determined at block 116 to a periodic curve. In an exemplary embodiment, the road segment traffic profile is fit using a regression or curve fitting algorithm (e.g., a linear, polynomial, exponential, or logarithmic curve fitting algorithm) which generates one or more parameters characterizing the periodic curve based at least in part on the road segment traffic profile. In a non-limiting example, the curve fitting algorithm uses an iterative process to determine optimal values for each of the one or more parameters. In a non-limiting example, the one or more parameters include a maximum traffic value, a minimum traffic value, a frequency, a period, one or more coefficients for a mathematical equation describing a curve fit, and/or the like. In a non-limiting example, the periodic curve is a sine wave, a cosine wave, a square wave, a triangle wave, a sawtooth wave, an arbitrary periodic wave, and/or the like. The one or more parameters and the periodic curve may be used to estimate or predict past or future values of the road segment traffic profile. After block 118, the method 100 proceeds to block 120.

At block 120, the server controller 30 identifies repeating time periods when the road segment traffic profile reaches a minimum value. In an exemplary embodiment, the server controller 30 identifies repeating time periods when the road segment traffic profile reaches the minimum value based at least in part on the periodic curve and the one or more parameters identified at block 118. In a non-limiting example, the repeating time periods are defined by the period of the periodic curve relative to the minimum traffic value. After block 120, the method 100 proceeds to blocks 122 and 124 via off-page connector to FIG. 3.

Figure 3:
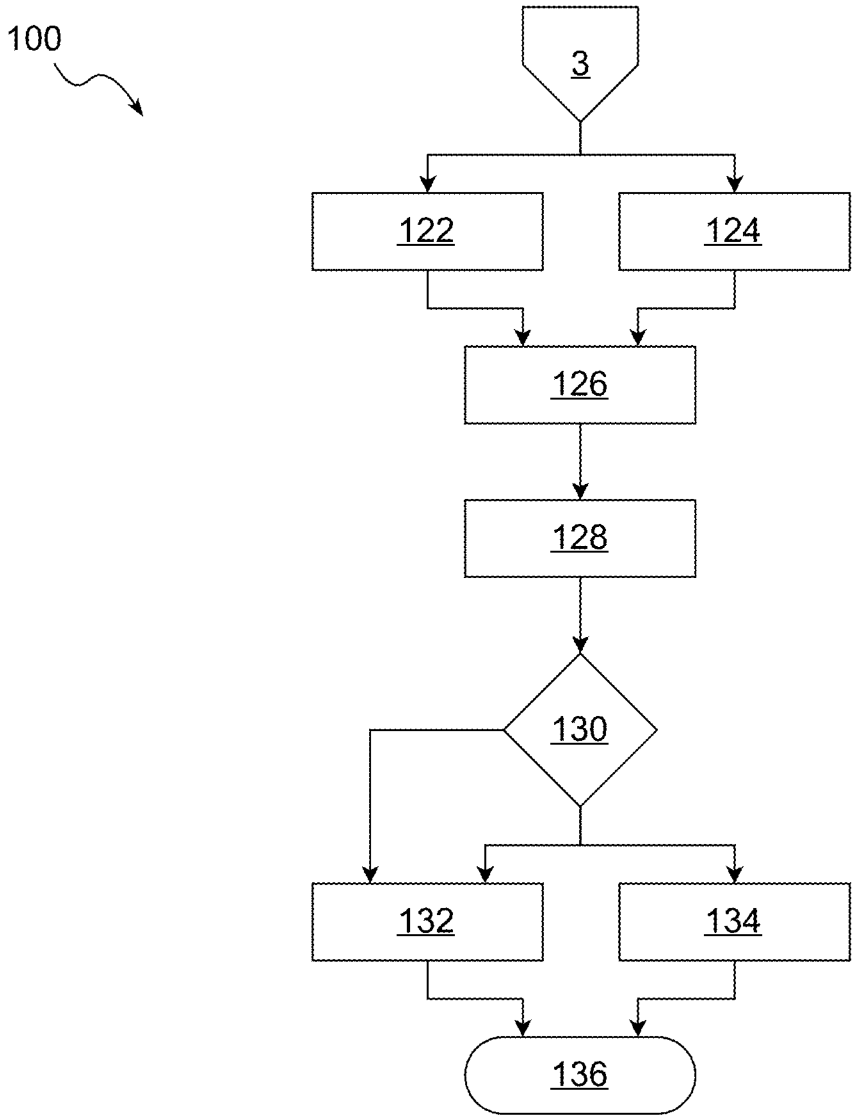
FIG. 3 is a continuation of the flowchart of FIG. 2 of the method for providing traffic information to the occupant of the vehicle, according to an exemplary embodiment.

Referring to FIG. 3, a continuation of the flowchart of FIG. 2 of the method 100 for providing traffic information to an occupant of a vehicle is shown. At block 122, the server controller 30 determines an estimated delay time. In the scope of the present disclosure, the estimated delay time is a time until the perceived traffic level on the segment of the second road 40*b* (i.e., the road segment traffic profile) is estimated to reach the minimum traffic value. In an exemplary embodiment, the estimated delay time is determined based at least in part on the one or more parameters, the periodic curve, and a current perceived traffic level of the segment of the second road 40*b*. In a non-limiting example, the server controller 30 determines the current perceived traffic level of the segment of the second road 40*b* based at least in part on the remote vehicle telemetry data. In a non-limiting example, the server controller 30 determines the estimated delay time by matching the current perceived traffic level to a point on the periodic curve determined at block 118 and subsequently measuring a time between the matching point on the periodic curve and the minimum traffic value. After block 122, the method 100 proceeds to block 126, as will be discussed in greater detail below.

At block 124, the server controller 30 determines an estimated travel time for the vehicle 12 to reach the node location 46. In an exemplary embodiment, the estimated travel time is determined based at least in part on the location of the vehicle 12 and the node location 46. In a non-limiting example, the server controller 30 determines a distance between the vehicle 12 and the node location 46. Subsequently, the server controller 30 determines the estimated travel time based at least in part on a free flow speed of the first road 40*a*. In another exemplary embodiment, the server controller 30 uses the detailed map stored in the server database 32 to determine a navigation path between the location of the vehicle 12 and the node location 46. The server controller 30 subsequently determines the estimated travel time based at least in part on the navigation path. After block 124, the method 100 proceeds to block 126.

At block 126, the server controller 30 determines an estimated wait time. In the scope of the present disclosure, the estimated wait time is an estimated amount of time that the vehicle 12 will need to wait before being able to traverse the intersection at the node location 46. In an exemplary embodiment, the estimated wait time is a difference between the estimated delay time determined at block 122 and the estimated travel time determined at block 124:

$$t_w = t_d - t_t \quad (1)$$

where $t_w$ is the estimated wait time, $t_d$ is the estimated delay time, and $t_t$ is the estimated travel time. After block 126, the method 100 proceeds to block 128.

At block 128, the server controller 30 determines an optimal departure delay. In the scope of the present disclosure, the optimal departure delay is an amount of time by which the occupant and/or the automated driving system 20 should delay departing from the location of the vehicle 12 such that the estimated wait time is zero upon the vehicle 12 reaching the node location 46. In an exemplary embodiment, the optimal departure delay is equal to the estimated wait time determined at block 126.

In another exemplary embodiment, the optimal departure delay is greater than or equal to the estimated wait time, because the optimal departure delay additionally accounts for signal phase timing of the traffic signal 42 (i.e., determined from the SPaT data received at block 108) such that the vehicle 12 may avoid stopping upon reaching the traffic signal 42. In a non-limiting example, the optimal departure delay is further adjusted based on a signal phase timing of the multiple traffic signals (i.e., determined from the SPaT data received at block 108) within the predetermined radius (e.g., two miles) of the node location 46 and/or along a planned route of the vehicle 12 such that the vehicle 12 experiences a "green wave". In the scope of the present disclosure, the term "green wave" refers to a phenomenon where the vehicle 12 experiences multiple green traffic signals in a row because the motion and/or route of the vehicle (e.g., speed and/or location) is coordinated with the SPaT data from multiple traffic signals. After block 128, the method 100 proceeds to block 130.

At block 130, the server controller 30 compares the optimal departure delay determined at block 128 to zero. If the optimal departure delay is equal to or nearly equal to zero, the present time is an optimal time to depart such that the estimated wait time is zero upon the vehicle 12 reaching the node location 46. If the optimal departure delay is within a predetermined range of zero (e.g., plus or minus two seconds from zero), the method 100 proceeds to blocks 132 and 134, as will be discussed in greater detail below. If the optimal departure delay is not within the predetermined range of zero, the method 100 proceeds only to block 132.

At block 132, the server controller 30 uses the server communication system 34 to transmit the optimal departure delay and the estimated wait time to the vehicle controller 14. The vehicle controller 14 receives the optimal departure delay and the estimated wait time using the vehicle communication system. Subsequently, the vehicle controller 14 uses the vehicle display 18 to provide a notification to the occupant of the vehicle 12 based at least in part on the optimal departure delay and/or the estimated wait time. In a non-limiting example, the notification includes a text and/or graphical message instructing the occupant to delay departing by the optimal departure delay. In another non-limiting example, the notification includes a text and/or graphical message informing the occupant of the estimated wait time. In another non-limiting example, the notification includes a text and/or graphical message informing the occupant of an optimal vehicle speed to reach the node location 46 such that the estimated wait time is zero. After block 132, the method 100 proceeds to enter a standby state at block 136.

At block 134, the server controller 30 uses the server communication system 34 to transmit the optimal departure delay and the estimated wait time to the vehicle controller 14. The vehicle controller 14 receives the optimal departure delay and the estimated wait time using the vehicle communication system. Subsequently, the vehicle controller 14 uses the automated driving system 20 to initiate an automated driving route in response to determining that the optimal departure delay is within the predetermined range of zero. In the scope of the present disclosure, initiating the automated driving route means that the vehicle controller 14 commands the automated driving system 20 to begin driving a predetermined and/or preplanned automated driving route towards a predetermined and/or preplanned destination. The predetermined and/or preplanned automated driving route includes the node location 46. In a non-limiting example, the vehicle controller 14 commands the automated driving system 20 to travel at an optimal vehicle speed to reach the node location 46 such that the estimated wait time is zero. After block 134, the method 100 proceeds to enter the standby state at block 136.

In an exemplary embodiment, the vehicle controller 14 repeatedly exits the standby state 136 and restarts the method 100 at block 102. In a non-limiting example, the vehicle controller 14 exits the standby state 136 and restarts the method 100 on a timer, for example, every three hundred milliseconds.

The system 10 and method 100 of the present disclosure offer several advantages. Using the system 10 and the method 100 the vehicle 12 may more easily transit the intersection at the node location 46 despite the difference in road class between the first road 40*a* and the second road 40*b*. Using the system 10 and method 100 results in increased occupant comfort and convenience. Furthermore, using the system 10 and the method 100, SPaT data from nearby traffic signals are accounted for, allowing for facilitation of "green wave" transit through multiple traffic signals, increasing occupant comfort and convenience. Additionally, using the method 100, the system 10 may initiate the automated driving at an optimal time, reducing occupant waiting time and mitigating traffic and congestion on the first road 40*a* and the second road 40*b*. Furthermore, the road segment traffic density profile may be used to determine estimated waiting times for additional road users (e.g., pedestrians, cyclists, and/or the like) and provide the estimated waiting times to the additional road users using physical displays near the node location 46 and/or using personal devices (e.g., smartphones).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing traffic information to an occupant of a vehicle, the method comprising:

identifying a node location in an environment surrounding the vehicle, wherein the node location is a location of an intersection between a first road upon which the vehicle is traveling and a second road, wherein the first road has a first road class and the second road has a second road class, and wherein the first road class is lower than the second road class;

determining traffic data about one or more remote vehicles traveling on a segment of the second road, wherein the segment of the second road is adjacent to the node location;

determining an estimated wait time for the vehicle based at least in part on the traffic data and a distance between the vehicle and the node location; and performing a first action based at least in part on the estimated wait time, wherein performing the first action further comprises:

determining an optimal departure delay based at least in part on the estimated wait time, wherein the optimal departure delay is an amount of time by which the vehicle should delay departing such that the estimated wait time is zero upon reaching the node location;

comparing the optimal departure delay to zero; and initiating an automated driving route using an automated driving system of the vehicle in response to determining that the optimal departure delay is within a predetermined range of zero.

2. The method of claim 1, wherein determining the traffic data further comprises:

receiving remote vehicle telemetry data from the one or more remote vehicles, wherein the remote vehicle telemetry data includes at least a location of each of the one or more remote vehicles; and determining the traffic data based at least in part on the remote vehicle telemetry data.

3. The method of claim 2, wherein determining the traffic data further comprises:

determining a percentage of the one or more remote vehicles traveling below a speed limit of the segment of the second road over a recent historical time period;

determining a percentage of the one or more remote vehicles traveling below a free flow speed of the segment of the second road over the recent historical time period;

determining a level of service categorization of the segment of the second road over the recent historical time period; and determining a road segment traffic profile based at least in part on at least one of: the percentage of the one or more remote vehicles traveling below a speed limit of the segment of the second road, the percentage of the one or more remote vehicles traveling below a free flow speed of the segment of the second road, or the level of service categorization of the segment of the second road, wherein the road segment traffic profile describes a perceived traffic level on the segment of the second road over the recent historical time period.

4. The method of claim 3, wherein determining the traffic data further comprises:

receiving signal phase and timing (SPaT) data from a traffic signal at the node location over the recent historical time period; and determining the road segment traffic profile based at least in part on at least one of: the percentage of the one or more remote vehicles traveling below a speed limit of the segment of the second road, the percentage of the one or more remote vehicles traveling below a free flow speed of the segment of the second road, the level of service categorization of the segment of the second road, or the SPaT data, wherein the road segment traffic profile describes a perceived traffic level on the segment of the second road over the recent historical time period.

5. The method of claim 3, wherein determining the estimated wait time further comprises:

identifying repeating time periods when the road segment traffic profile reaches a minimum value; and determining the estimated wait time based at least in part on the repeating time periods when the road segment traffic profile approaches the minimum value.

6. The method of claim 5, wherein identifying the repeating time periods when the road segment traffic profile reaches a minimum value further comprises:

fitting the road segment traffic profile to a periodic curve;

determining one or more parameters characterizing the periodic curve, wherein the one or more parameters includes at least a minimum traffic value and a period; and identifying the repeating time periods based at least in part on the minimum traffic value and the period.

7. The method of claim 6, wherein determining the estimated wait time based at least in part on the repeating time periods further comprises:

determining an estimated delay time until the perceived traffic level on the segment of the second road is estimated to reach the minimum traffic value based at least in part on the one or more parameters characterizing the periodic curve and a current perceived traffic level of the segment of the second road;

determining an estimated travel time for the vehicle to reach the node location based at least in part on the distance between the vehicle and the node location and a free flow speed of the first road; and determining the estimated wait time based at least in part on the estimated delay time and the estimated travel time, wherein the estimated wait time is a difference between the estimated delay time and the estimated travel time.

8. The method of claim 1, wherein performing the first action further comprises:

providing a notification to the occupant of the vehicle based at least in part on the estimated wait time using a vehicle display.

9. The method of claim 8, wherein providing the notification further comprises:

determining an optimal departure delay based at least in part on the estimated wait time, wherein the optimal departure delay is an amount of time by which the occupant should delay departing such that the estimated wait time is zero upon reaching the node location; and providing the notification to the occupant of the vehicle based at least in part on the optimal departure delay.

10. A system for providing traffic information to an occupant of a vehicle, the system comprising:

a server system comprising:

a server communication system; and a server controller in electrical communication with the server communication system, wherein the server controller is programmed to:

identify a node location in an environment surrounding the vehicle, wherein the node location is a location of an intersection between a first road upon which the vehicle is traveling and a second road, wherein the first road has a first road class and the second road has a second road class, and wherein the first road class is lower than the second road class;

determine traffic data about one or more remote vehicles traveling on a segment of the second road using the server communication system, wherein the segment of the second road is adjacent to the node location;

determine an estimated wait time for the vehicle based at least in part on the traffic data and a distance between the vehicle and the node location; and transmit the estimated wait time using the server communication system; and a vehicle system comprising:

a vehicle communication system;

a vehicle display;

an automated driving system; and a vehicle controller in electrical communication with the vehicle communication system, the vehicle display, and the automated driving system, wherein the vehicle controller is programmed to:

determine an optimal departure delay based at least in part on the estimated wait time, wherein the optimal departure delay is an amount of time by which the vehicle should delay departing such that the estimated wait time is zero upon reaching the node location;

compare the optimal departure delay to zero; and initiate an automated driving route using the automated driving system in response to determining that the optimal departure delay is within a predetermined range of zero.

11. The system of claim 10, wherein to determine the traffic data, the server controller is further programmed to:

receive remote vehicle telemetry data from the one or more remote vehicles using the server communication system, wherein the remote vehicle telemetry data includes at least a location of each of the one or more remote vehicles; and determine the traffic data based at least in part on the remote vehicle telemetry data.

12. The system of claim 11, wherein to determine the traffic data, the server controller is further programmed to:

determine a percentage of the one or more remote vehicles traveling below a speed limit of the segment of the second road over a recent historical time period based at least in part on the remote vehicle telemetry data;

determine a percentage of the one or more remote vehicles traveling below a free flow speed of the segment of the second road over the recent historical time period based at least in part on the remote vehicle telemetry data;

determine a level of service categorization of the segment of the second road over the recent historical time period based at least in part on the remote vehicle telemetry data;

receive signal phase and timing (SPaT) data from a traffic signal at the node location over the recent historical time period; and determine a road segment traffic profile based at least in part on at least one of: the percentage of the one or more remote vehicles traveling below a speed limit of the segment of the second road, the percentage of the one or more remote vehicles traveling below a free flow speed of the segment of the second road, the level of service categorization of the segment of the second road, or the SPaT data, wherein the road segment traffic profile describes a perceived traffic level on the segment of the second road over the recent historical time period.

13. The system of claim 12, wherein to determine the estimated wait time, the server controller is further programmed to:

fit the road segment traffic profile to a periodic curve;

determine one or more parameters characterizing the periodic curve, wherein the one or more parameters includes at least a minimum traffic value and a period;

identify repeating time periods when the road segment traffic profile reaches a minimum value based at least in part on the minimum traffic value and the period; and determine the estimated wait time based at least in part on the repeating time periods when the road segment traffic profile approaches the minimum value.

14. The system of claim 13, wherein to determine the estimated wait time, the server controller is further programmed to:

determine an estimated delay time until the perceived traffic level on the segment of the second road is estimated to reach the minimum traffic value based at least in part on the one or more parameters characterizing the periodic curve and a current perceived traffic level of the segment of the second road;

determine an estimated travel time for the vehicle to reach the node location based at least in part on the distance between the vehicle and the node location and a free flow speed of the first road; and determine the estimated wait time based at least in part on the estimated delay time and the estimated travel time, wherein the estimated wait time is a difference between the estimated delay time and the estimated travel time.

15. A method for providing traffic information to an occupant of a vehicle, the method comprising:

identifying a node location in an environment surrounding the vehicle, wherein the node location is a location of an intersection between a first road upon which the vehicle is traveling and a second road, wherein the first road has a first road class and the second road has a second road class, and wherein the first road class is lower than the second road class;

receiving remote vehicle telemetry data from one or more remote vehicles traveling on a segment of the second road, wherein the remote vehicle telemetry data includes at least a location of each of the one or more remote vehicles, and wherein the segment of the second road is adjacent to the node location;

receiving signal phase and timing (SPaT) data from a traffic signal at the node location;

determining a road segment traffic profile based at least in part on the remote vehicle telemetry data and the SPaT data, wherein the road segment traffic profile describes a perceived traffic level on the segment of the second road over a recent historical time period;

determining an estimated wait time for the vehicle based at least in part on the remote vehicle telemetry data, the SPAT data, and a distance between the vehicle and the node location, wherein determining the estimated wait time further comprises:

fitting the road segment traffic profile to a periodic curve;

determining one or more parameters characterizing the periodic curve, wherein the one or more parameters includes at least a minimum traffic value and a period;

identifying repeating time periods when the road segment traffic profile reaches a minimum value based at least in part on the minimum traffic value and the period;

determining an estimated delay time until the perceived traffic level on the segment of the second road is estimated to reach the minimum traffic value based at least in part on the one or more parameters characterizing the periodic curve and a current perceived traffic level of the segment of the second road;

determining an estimated travel time for the vehicle to reach the node location based at least in part on the distance between the vehicle and the node location and a free flow speed of the first road; and determining the estimated wait time based at least in part on the estimated delay time and the estimated travel time, wherein the estimated wait time is a difference between the estimated delay time and the estimated travel time;

providing a notification to the occupant of the vehicle based at least in part on the estimated wait time using a vehicle display;

determining an optimal departure delay based at least in part on the estimated wait time, wherein the optimal departure delay is an amount of time by which the vehicle should delay departing such that the estimated wait time is zero upon reaching the node location;

comparing the optimal departure delay to zero; and initiating an automated driving route using an automated driving system of the vehicle in response to determining that the optimal departure delay is within a predetermined range of zero.

* * * * *